May 31, 1938.   K. MAYBACH   2,118,978
GEAR-CHANGING DEVICE FOR MOTOR VEHICLES
Filed Dec. 4, 1935    5 Sheets-Sheet 1

Inventor: Karl Maybach

May 31, 1938.                K. MAYBACH                2,118,978
GEAR-CHANGING DEVICE FOR MOTOR VEHICLES
Filed Dec. 4, 1935           5 Sheets-Sheet 2

Inventor: Karl Maybach,
By Watson, Coit, Morse + Grindle
Attys.

May 31, 1938. K. MAYBACH 2,118,978
GEAR-CHANGING DEVICE FOR MOTOR VEHICLES
Filed Dec. 4, 1935 5 Sheets-Sheet 3
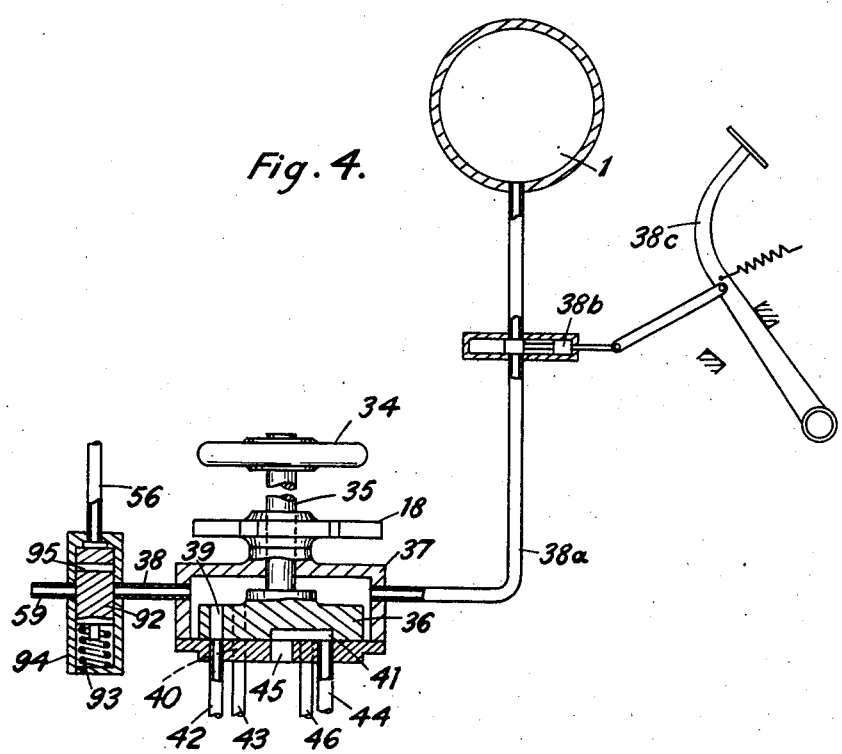

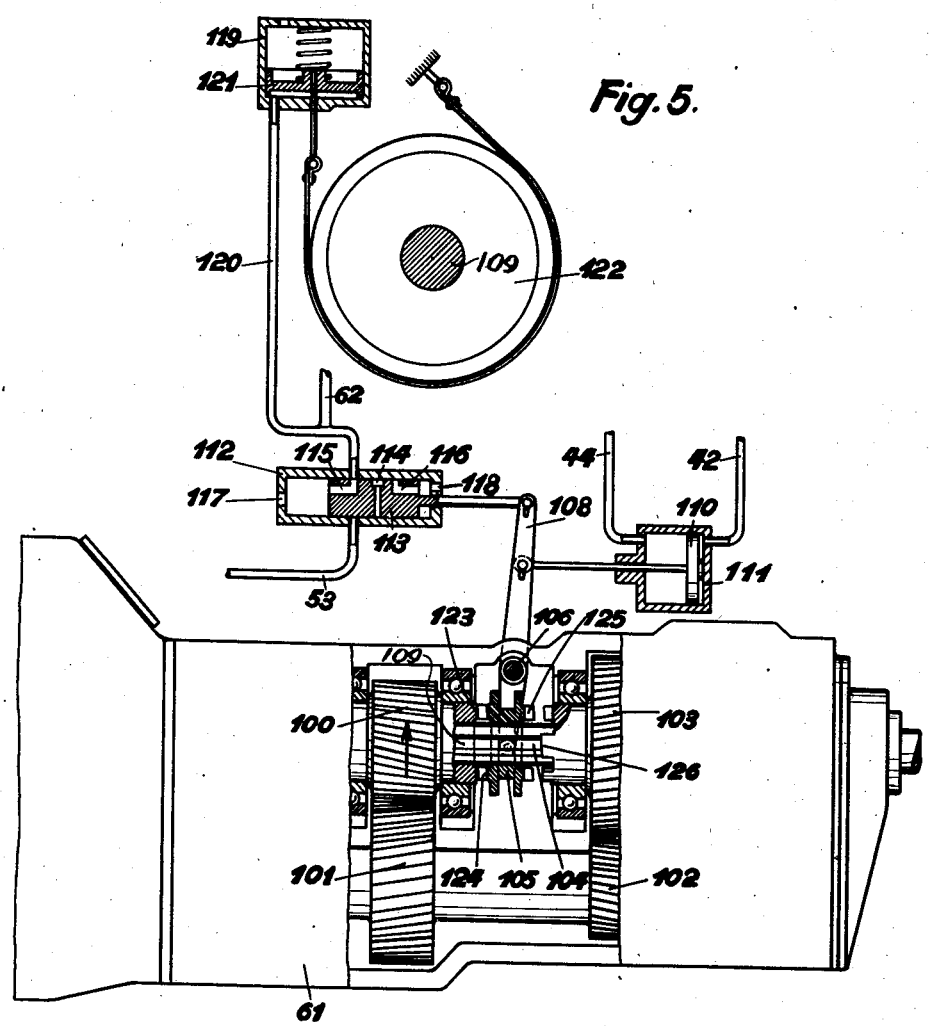

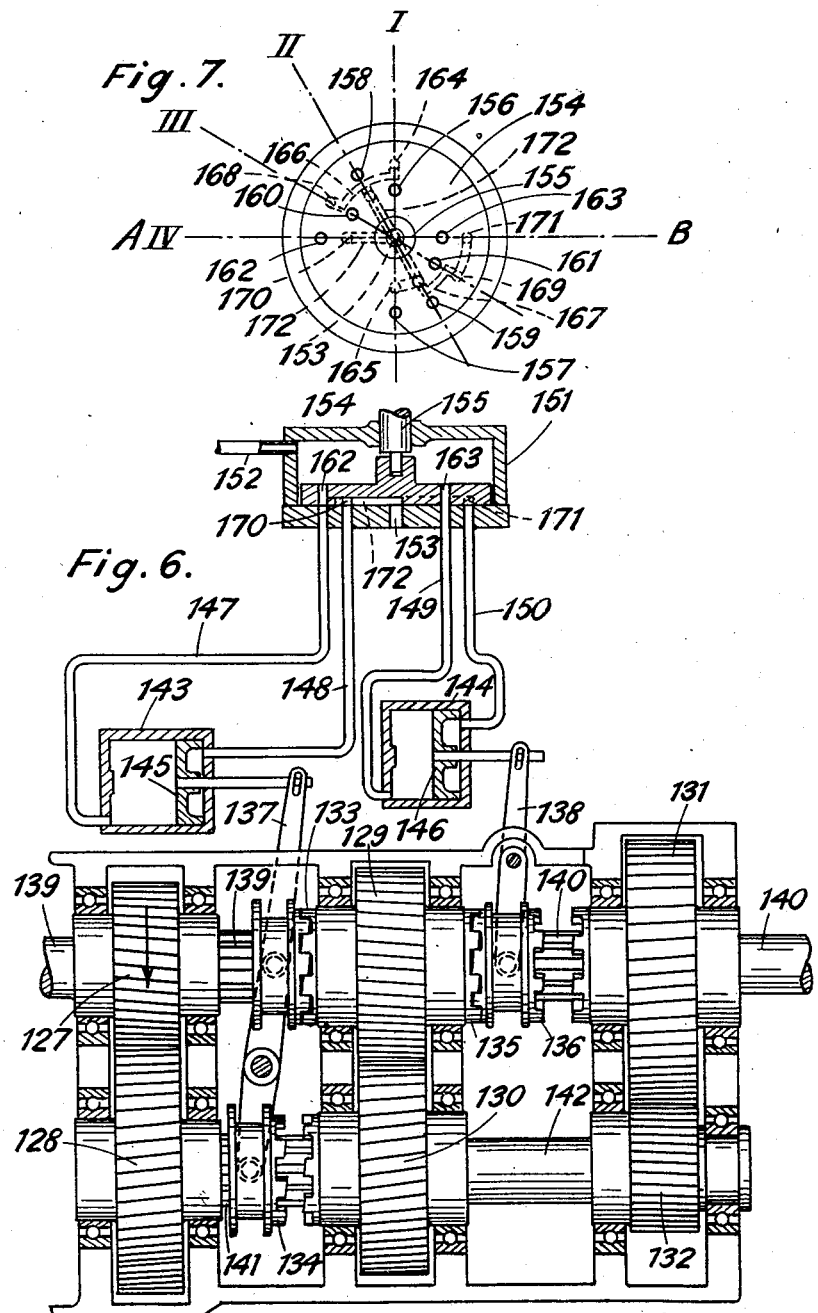

Patented May 31, 1938

2,118,978

UNITED STATES PATENT OFFICE 2,118,978

GEAR-CHANGING DEVICE FOR MOTOR VEHICLES

Karl Maybach, Friedrichshafen-on-the-Bodensee, Germany, assignor to Maybach-Motorenbau G. m. b. H., Friedrichshafen-on-the-Bodensee, Germany Application December 4, 1935, Serial No. 52,919
In Germany December 12, 1934

12 Claims. (Cl. 74—472)

The invention relates to a gear-changing device for the change-speed gearing of motor vehicles (road motor vehicles and rail motor vehicles), whereby the operation of gear-changing is simplified and to some extent is performed automatically, and the safety of driving the vehicle is increased. A large number of devices for the automatic gear-changing of change-speed gearing, more particularly in accordance with the engine speed are already known. None of these automatic devices has become established because when the speed or torque which is decisive for the operation of such a device has been attained, the automatic device also effects gear changes in cases in which such gear changes are not desired by the driver.

The invention provides a gear-changing device which operates automatically under predetermined conditions but which may also be operated optionally at any time by the driver. In the gear-changing device according to the invention, there is provided a gear-changing control member which controls the supply of operating medium to the members effecting the change of gear, for example the supply of pressure medium to cylinders, the pistons of which act upon the gear-changing rod. This gear-changing control member may on the one hand, be moved optionally by the driver in two directions, that is to say for engaging a higher or lower gear. On the other hand, the control member according to the invention is controlled by a control means dependent upon the engine speed whereby for example a pressure medium is controlled, after a maximum engine speed has been reached, for the engagement of a higher gear. The device is, however, constructed so that this automatic control means cannot effect a change from a higher gear to a lower gear. On the contrary, the downward gear-changing can be effected always only by the driver.

By means of the automatic device according to the invention, it is possible at the same time to dispense with the governor customarily provided heretofore, for example in omnibuses and rail motor vehicles, for preventing the maximum engine speed from being exceeded. On attaining the maximum engine speed, the engine is not throttled but the next higher gear is engaged.

The engine speed at which the automatic operation of the gear-changing control member takes place may, in a further development of the invention, be varied as desired by the driver. This is effected for example by varying the loading of a centrifugal governor. Automatic gear-changing may thereby also be influenced by the driver and adapted to the existing conditions.

The advantages of the automatic gear-changing device are more particularly felt when starting, for example in the case of city or town omnibuses which, due to the frequent halts, have always to be starting again so that the driver is burdened with this work of gear-changing and his attention is diverted from the actual driving of the vehicle.

On the other hand, the driver can at any time interrupt an automatic gear-changing sequence in operation as soon as he considers it desirable to have an optional gear change. If the vehicle has for example been started and the device has after the first gear, automatically engaged the second gear, the driver can engage by hand the fourth or a still higher gear directly, the third gear being passed over.

Furthermore, according to the invention it is also possible by means of the working medium, for example compressed air, actuating the gear-changing control member, to effect the closing of the carburettor throttle or the supply of fuel, preferably towards the end of the adjusting movement of the gear-changing control member. The device for closing the carburettor throttle may also be combined with a brake device acting upon the more rapidly rotating clutch member. After changing gear, the actuation of the carburettor throttle is immediately released again.

The automatic change of gear, to the next higher gear on exceeding the maximum engine speed, is effected in the device according to the invention without the assistance of the driver and without influence upon the setting of the accelerator which has just been made by the driver. If the driver has for example previously set the accelerator to full supply of combustible mixture, the accelerator remains in this position, irrespective of the regulation of the carburettor throttle by the automatic device. Gear-changing is effected exactly at the right moment, that is, upon obtaining the maximum engine speed selected for the gear in question or the vehicle speed corresponding to the said engine speed.

The driver is relieved of the work of gear changing, for example on starting, and may devote his whole attention to the steering of the vehicle. Nevertheless, he can at any time change gear directly by hand in the sequence and speed which appear expedient to him. Above all, however, gear changing from a higher to a lower gear is not effected by the automatically operating part of the device, but is left entirely to the driver, who will effect gear-changing not only according to the vehicle speed, but only when the torque produced by the resistances to travelling demands this. On the other hand, without having specially to disengage the automatic device, the driver may even travel in top gear at a very low speed. He is thereby also not obliged to engage the automatic device again for the next case of need, which would in some cases be done too late.

The device according to the invention need only have a small weight and occupy a small amount of space, and it enables the usual clutch to be employed between the engine and change speed gearing without modification, more particularly without the addition of centrifugal weights. It also enables the necessary parts to be manufactured in large quantities and in uniform sizes for various types of vehicles.

The action upon the regulating member of the carburettor may be effected directly by the working medium controlled in accordance with the engine speed, but in a further development of the invention, it is effected by the fact that a control member, which is moved by the working medium controlled in accordance with the engine speed is held in its gear-changing position until gear-changing has been effected.

In combination with the control member for changing gear in the change-speed gearing, it is also possible to provide a device for disengaging the clutch during the gear-changing operation. The device according to the invention will be employed with particular advantage, however, for change-speed gearing in which a disengagement of the clutch is not necessary, for example for change-speed gearing having over-running clutches, for example the known alternately engaged dog clutches, wherein the end faces of the dogs are bevelled so that upon the application of the end faces of the dogs against each other prior to the engagement, the said bevelled portions cause the clutch members to refuse each other until the previously more slowly running clutch member begins to run more rapidly than the other clutch member. In such gearing, in combination with the automatic gear-changing device according to the invention, gear-changing is effected not only at the correct moment without the assistance of the driver, the gear-changing operation being completed in the shortest possible time, but also without any shock or unpleasant effect on the vehicle and its occupants, such as occur in the case of other types of gearing and automatic gear-changing devices. Also complicated and expensive synchronizing devices are not necessary.

In such change-speed gearing with over-running clutches, known auxiliary devices may be provided whereby, during the rejection period of the dogs, one of the clutch members is retarded or accelerated in order to attain the over-running speed as quickly as possible. Preferably, in such a case, a device operated by pressure medium will be employed. Such devices are described for example in the German patent specification No. 569,392. The pressure medium operative in such a retarding device may also be employed with special advantage in the device according to the invention for holding the control member, which is actuated by the pressure controlled in accordance with the engine speed, in the position adjusted by the said pressure until the gear-changing operation is completed. After completion of the gear-changing operation, the pressure supplied by the auxiliary device disappears under the influence of the control of the auxiliary device, the device for actuating the carburettor being thereby also released.

The optional adjustment of the carburettor by the driver may be effected by the usual devices employing suitable mechanical connections between such devices and the corresponding parts of the device according to the invention, for example a lost motion connection may be provided in the rod gear connected to the accelerator. With special advantage however, the adjustment will likewise be transmitted by pressure medium from the adjusting member operated by the driver to the device actuating the regulating member of the carburettor, in which case the control member actuated by the pressure in accordance with the engine speed will be arranged in the conduit for the pressure medium between the adjusting member and the actuating device, so that the admission of the pressure medium supplied from the adjusting member is prevented by the said control member so long as the automatic gear-changing device is in operation.

Two constructional examples of gear-changing devices according to the invention are shown diagrammatically in the accompanying drawings.

Figure 4 shows a section along the line B—B in Figure 3.

Figure 5 shows the opera¡ng parts of a change-speed gear controlled by the device shown in Figures 1 and 2 or by the device shown in Figures 3 and 4.

Figure 6 shows diagrammatically a four-speed gear with gear-changing cylinders and control means.

Figure 7 shows by way of example a plan of an arrangement of the air passages for controlling the gear changing cylinders.

Figure 1:
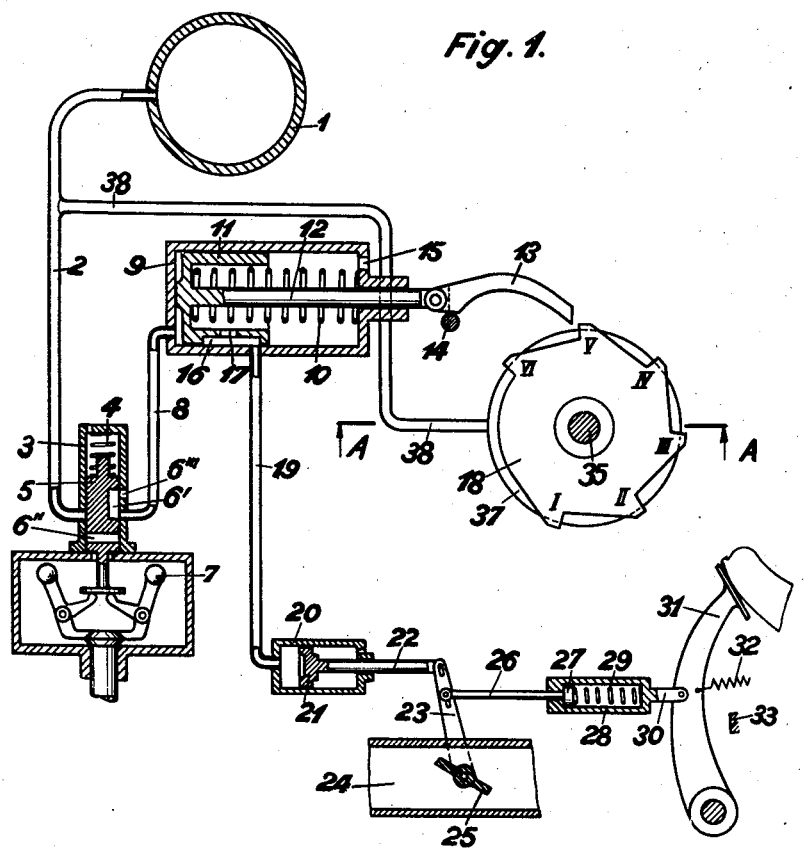
Figure 1 shows a first example with the operating parts mainly in section.

Referring to Figure 1, at 1 is shown a source of compressed air, 2 is a conduit between the said source and the casing 3 of the control slide valve 5 loaded by a spring 4. The said valve 5 comprises a passage 6" and a longitudinal groove 6' opposite an aperture 6'" in the casing 3 and is actuated by a centrifugal governor 7. The conduit 8 leads from the casing 3 to a cylinder 9, in which is situated a piston 11 loaded by a spring 10 and having its piston rod 12 connected to a pawl 13 resting on a stop pin 14. At 15 is an aperture for providing communication with the outer air, while 16 is a recess in the wall of the piston 11 communicating with a cylinder chamber by way of an orifice 17. 18 is a ratchet wheel. The conduit 19 leads from the cylinder 9 to a cylinder 20 containing a piston 21, having its piston rod 22 engaging a lever 23 which is connected to the throttle valve 25 provided in the carburettor pipe 24 and is also engaged by a link 26. The disc 27, connected to the latter, is accommodated in a casing 28 and is under the pressure of a spring 29. The casing 28 is connected to a rod 30 which engages the accelerator 31 pulled by the spring 32 against the stop 33.

Figure 2:
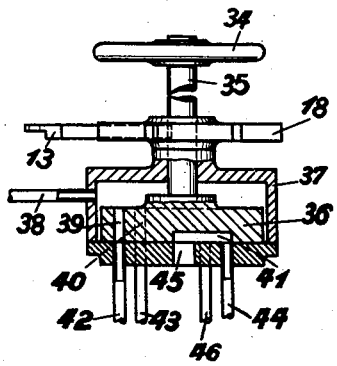
Figure 2 shows a section along the line A—A in Figure 1.

Figure 2 is a section along the line A—A of Figure 1. In this figure 34 is a hand wheel, 35 a spindle on which is mounted the ratchet wheel 18 and which is connected by its lower end to a distributing valve 36 situated in the casing 37 which by way of the conduit 38 communicates with the source of compressed air 1. 39 and 40 are passages, 41 is a recess in the valve 36, and 45 is an orifice communicating with the outer air. The conduits 42, 44 lead to the cylinder 111 (Figure 5) of the device for operating the change-speed gearing with which the gear-changing device is associated. The conduits 43 and 46 likewise lead to a cylinder (not shown) corresponding to the cylinder 111.

The operation of the gear-changing devices shown in Figures 1 and 2 is as follows:—

The various parts are in the positions shown in Figure 1 during normal travelling, that is to say so long as no automatic gear-changing takes place. The various teeth I to VI of the ratchet wheel 18 correspond to 6 forward speeds. The gap between tooth VI and tooth I is left for the reverse speed and if desired for idling. The accelerator 31 has been moved by the driver so far from its stop 33 that by means of the rods 30, 28, 26, 23 the throttle valve 25 has been adjusted to an intermediate position between idle running and full supply of combustible mixture.

Assuming that the vehicle is travelling in the 4th gear, the tooth V of the ratchet wheel 18 will be in front of the pawl 13.

The centrifugal governor 7 is driven off a shaft connected with the driving engine of the motor vehicle. So long as the speed of the engine is less than the maximum speed, the centrifugal governor 7 and hence also the control valve 5 occupy the position shown in the figure. The conduit 8 is connected to the outer air by the groove 6'. The tension of the spring 4 is so great that the force of the centrifugal governor 7 only exceeds it at maximum engine speed. When the maximum engine speed is reached, the control valve 5 is moved upwardly by the centrifugal governor to connect the compressed air supply conduit 2 by the passage 6" with the conduit 8.

The pressure is transmitted through the conduit 8 to the piston 11 and moves the latter to the right. The pawl 13 is thereby brought into engagement with the ratchet wheel 18, and the latter is thereby rotated by one tooth division, so that therefore the tooth V is brought into the position of the tooth IV. By this rotation (Figure 2) the spindle 35 and the hand wheel 34 connected thereto as well as the valve 36, which previously were in the position corresponding to the 4th gear, are rotated into the position corresponding to the 5th gear. Whereas therefore previously the conduit 42 leading to the cylinder 111 (Figure 5) of the operating device of the change-speed gear was connected by the passage 39 to the space above the valve 36 and hence to the compressed air supply conduit 38, the conduit 44 which likewise leads to said cylinder 111 and previously was connected to the outer air via the recess 41 of the valve 36 and the hole 45, is now brought into communication with the space situated above the valve 36 and hence with the compressed air supply conduit 38, and simultaneously the conduit 42 is connected to the outer air via the recess 41 of the valve 36 and the hole 45. In the same way also the conduits 43 and 46 leading to another cylinder (not shown) corresponding to this cylinder 111 and controlling another dog clutch may likewise be connected to the pressure medium conduit 38 or to the outer air. The parts 112 to 122 shown in Figure 5 are omitted when using the arrangement shown in Figure 1. These parts are described later with reference to Figure 3.

Towards the end of the stroke of the piston 11, the left-hand boundary edge of the groove 16 closes the conduit 19 and as the piston 11 moves further to the right, the edge of the outer end base of the said piston uncovers the admission to the conduit 19 from the chamber of the cylinder 9 situated on the left of the piston 11. The compressed air supplied thereby passes through the conduit 19 and enters the cylinder 20. The piston 21, which occupies a position corresponding to the adjustment of the accelerator 31 by the driver, is thereby moved into its right-hand end position and acting through the piston rod 22 and the lever 23 brings the throttle valve 25 into the closed or idle running position. The rod 26 is also shifted to the right and the spring 29 is compressed accordingly, but the accelerator 31 can be held by the driver without difficulty in the adjusted position. In this closed or idle running position of the throttle valve 25, the dog clutches 125, 126 heretofore in engagement are relieved of load, whereby in consequence of the insertion of the fifth speed as described hereinbefore, the compressed air in the conduit 44 becomes operative and, upon the movement of the piston 110 from its left-hand end position into its right-hand end position shown in Figure 5, brings the dog clutches 125, 126 out of engagement and the dog clutches 123, 124 into engagement with one another.

The automatic gear-changing has thus been performed. In the meantime, the speed of the engine and hence that of the centrifugal governor 7 will have diminished and the control valve 5 will have returned into its lower position. Due to the reduction in the pressure on the left of the piston 11 and in the conduit 8 by the fact that these spaces are put into communication with the outer air through the groove 6' (or even merely through leakage), the piston 11 will return to its left-hand end position. The pawl 13 is thereby lifted off the ratchet wheel again and returns into the position shown in Figure 1. The conduit 19 is again connected by the groove 16 and the orifices 17 and 15 with the outer air, so that the piston 21 returns under the action of the spring 29 into the position shown in Figure 1 and hence the throttle valve 25 also is again brought into the position set by the driver.

If at any time it is desired to make an optional gear change, either to a higher or a lower speed, the handwheel 34 is simply rotated to bring the valve 36 into the appropriate position and the change of gear is then carried out by the gear changing cylinders.

Figure 3:
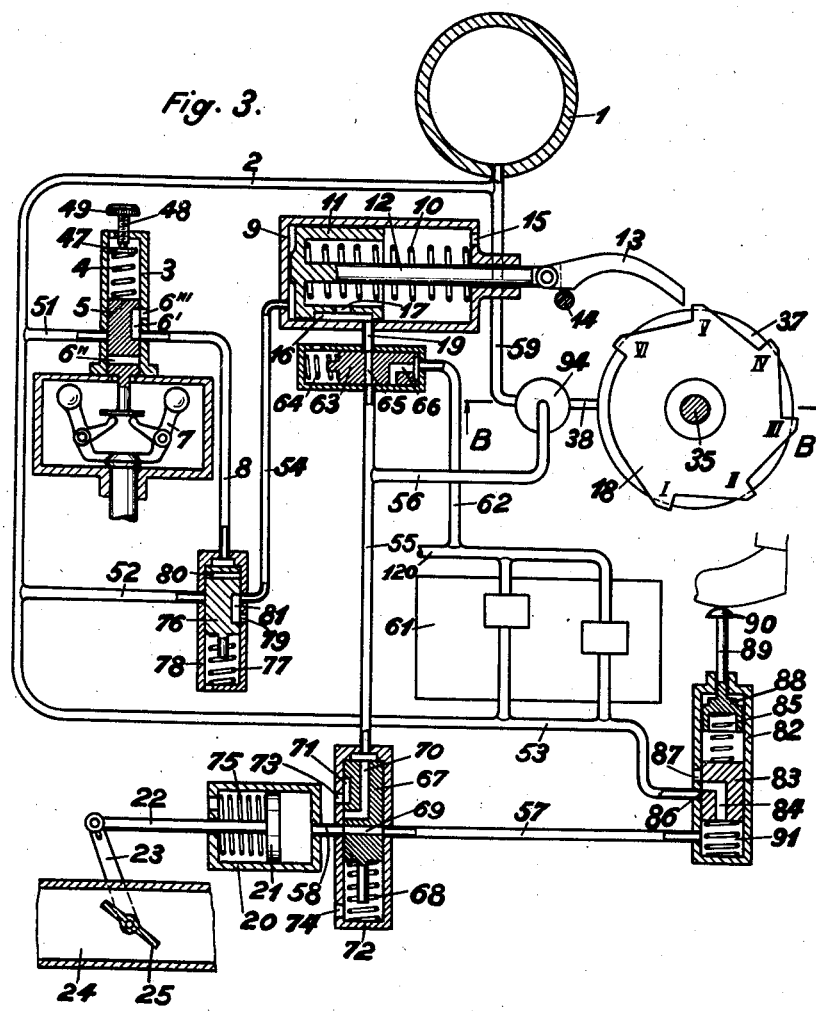
Figure 3 shows a second example with the operating parts mainly in section.

In Figure 3 certain parts will be recognized as being similar to parts already described in connection with Figure 1. These parts have been given the same reference numerals and it will not be necessary to describe them again in detail.

In this embodiment the spring 4 of the centrifugal governor bears against a disc 47 connected to a screw-threaded rod 48 which carries a small handwheel 49 on its upper end. 63 is a valve under the pressure of the spring 64 and this valve comprises a transverse pasage 65 and an angular passage 66. 67 is a further control valve which is under the action of the spring 68 and likewise comprises a transverse passage 69, an angular passage 70 and a longitudinal groove 71. In the casing 72 of this valve are also two orifices 73 and 74, which are in communication with the outer air. The piston 21 for actuating the throttle valve 25 is loaded by a spring 75. 76 is a control valve which is loaded by the spring 77 and to the casing, 78 of which are connected the conduit 8 at the top and laterally the conduits 52 and 54. 79 is an orifice communicating with the outer air, 80 is a transverse passage, 81 a longitudinal groove in the valve 76. The valve 76 acts as a relay valve relatively to the valve 5, so that the loading of the latter may be reduced and a more accurate response obtained with a governor and valve of light and small construction. 82 is a casing accommodating a slidable control valve 83 which comprises an angular passage 84 and is under the action of the spring 85. In the casing 82 the communication with the compressed air supply conduit 53 is provided at 86, and at 87 is an orifice communicating with the outer air. The spring 85 bears with its upper end against a piston 88 provided with a rod 89 carrying a knob 90 on its upper end. 91 is the pressure chamber of the casing 82 to which the conduit 57 is connected, the said pressure space being situated below the valve 83.

Figure 4 is a cross-section along line B—B of Figure 3 and like Figure 2, shows the control valve 36 and conduits connected thereto, the ratchet wheel 18 and the handwheel 34. In addition, this figure also shows a valve 92 which is mounted at the junction of the conduits 59 and 38, is loaded by a spring 93 and possesses a transverse passage 95. Connected to one end of the casing 94 of this valve 92 is a conduit 56.

Figure 5 shows the operative parts of the change-speed gear 61 shown in Figure 3. In this gear, like the construction protected for the inventor by Re-issue 17,705 and by the U. S. Patents 1,949,167 and 1,949,168, two dog clutches 123, 124 and 125, 126 are arranged between two pairs of gear wheels 100, 101 and 102, 103 in constant mesh, and on disengaging one of the dog clutches, the clutch members of the other dog clutch are brought without delay and without taking up any intermediate position of rest, into yielding contact with one another. The end faces of the clutch dogs are bevelled so that on this contacting of the clutch members, the latter first always refuse each other until the first more rapidly rotating clutch member begins to become the slower member, whereupon final engagement takes place. The gear wheel 100 is loose on the engine shaft 109, which carries on its splined portion 104 the slidable double dog sleeve 105. This sleeve 105 in the left-hand end position shown in the drawings connects the gear wheel 100 with the engine shaft 109, so that the drive takes place through the gear wheels 100, 101, 102 and 103. On a spindle 106 is a double-arm lever 108 connected with a piston 110, the positions of this piston 110 within its cylinder 111 connected to the casing 37 (Figure 4) of the distributor valve 38 by means of the conduits 42, 44, being determined by the particular position of the valve 36. The double-armed lever 108 acts upon a control valve 113 slidable in the casing 112 and having a passage 114 adapted to connect the conduit 53 supplying the pressure medium with the conduit 62 leading to the valve 63 (Figure 3). In addition, the control valve 113 has two angular passages 115 and 116 for communication with the outer air and the casing 112 has air escape bores 117 and 118. Branching off the conduit 62 is a conduit 120 connected to a cylinder 119, having its piston 121 connected to a brake device 122 serving for retarding the more rapidly running dog clutch member. For clearness the brake device 122 has been shown separately in end view, though actually it is carried in the main clutch casing or in the gearbox unit 61.

The operation of the gear-changing device shown in Figures 3, 4 and 5 is similar to the constructional example shown in Figures 1 and 2. In the device according to Figure 3, however, the operation of accelerating is carried out by means of the device accommodated in the casing 82 with compressed air transmission by the fact that, upon the knob 90 being gradually depressed by the driver, the spring 85 is compressed by the plunger 88, whereby an increasing pressure is exerted on the valve 83. The latter thereby moves downward a little from the central position shown and uncovers the compressed air supply conduit a little at the connection 86, so that a certain quantity of compressed air can enter. The pressure in the chamber 91 is thereby increased sufficiently to equalize the tension of the spring 85 adjusted by the driver, and in this way the valve 83 is again returned to its central position. Upon the knob 90 being released, the spring 85 is correspondingly relaxed, the valve 83 moves upward a little and allows some compressed air to escape at the mouth of the orifice 87, so that the pressure in the chamber 91 falls until equilibrium is against established between the said pressure and the tension of the spring 85 adjusted by the driver. In this case also, the valve 83 immediately returns to its central position.

The pressure adjusted in the chamber 91 in this way is transmitted through the conduit 57 and the transverse passage 69 of the valve 67, as well as the conduit 58 to the cylinder 20, and the piston 21 in accordance with the adjusted pressure which maintains the spring 75 in equilibrium is moved more or less to the left, and thereby the throttle valve 25 is correspondingly opened.

Upon reaching the maximum engine speed, in the constructional example of Figure 3, the control valve 5 connected with the centrifugal governor 7 is also moved upwardly until compressed air enters the conduit 8. This compressed air enters the chamber above the valve 76. The latter is thereby moved into its lower end position and instead of the pressure of the outer air previously transmitted through 79, 81, 54 and prevailing on the left of the piston 11, compressed air now passes from the conduit 52 through the passage 80 into the conduit 54 and behind the piston 11.

In the same way as was described with reference to Figure 1, the pawl 13 will now advance the wheel 18 by one tooth. Towards the end of the stroke of the piston 11, instead of the pressure of the outer air previously acting in the conduit 19 through 16, 17, 15, compressed air will be supplied to the conduit 19 as soon as the left-hand edge of piston 11 has passed over the admission opening of conduit 19 into the cylinder 9 thereby connecting conduits 54 and 19 with one another. This compressed air passes through the passage 65 of the valve 63 and the conduit 55 above the valve 67, which is thereby moved into its lower end position, in which the conduit 58 is connected to the orifice 73 by the groove 71. The compressed air contained in the cylinder 20 is thereby released and the piston 21 moves into its right-hand end position under the action of the spring 75, whereby the throttle valve 25 is adjusted to the idle-running position by the rod 22 and the lever 23.

Upon the downward movement of the valve 67, compressed air can first pass for a moment 74 through the passage 70 into the conduit 58 and hence into the chamber of the cylinder 20 on the right-hand of the piston 21 while the end of the passage 70 is sliding over the connection of the conduit 58 to the casing 72. This is provided in order that when a vehicle provided with such a device is travelling downhill with an intermediate gear of the change-speed gearing engaged and the carburetor is adjusted by the driver to idle-running, the brief supply of compressed air moves the piston 21 somewhat to the left out of the idle-running position (right-hand end position), that is to say the throttle valve is opened somewhat, thereby producing a change of torque in the clutches of the change-speed gearing so that the gear speed then in use is surely brought out of action.

When the throttle valve 25 has been adjusted to a central position by the driver in the manner described hereinbefore, the brief supply of compressed air through the passage 70 to the cylinder 20 during the downward movement of the valve 67 will have little or no effect on the setting of the carburettor, since in any case there prevails in the cylinder 20 a certain air pressure which is not substantially altered by the brief supply of compressed air.

As soon as the valve 67 is in its lower position and the throttle valve is consequently closed, the speed of the engine falls. The control valve 5 again returns to its lower position and the supply of compressed air through the conduit 8 ceases. The latter is again connected to the outer air by the groove 6', the valve 76 again returns into its upper end position under the action of the spring 77 and connects the conduit 54 once more with the outer air through the groove 81 and the orifice 79. The piston 11 thereby returns into its left-hand end position and the conduit 19 is also connected to the outer air by 16, 17, 15.

On the movement of the piston 11 into its right-hand position, the wheel 18 (Figure 3) as described hereinbefore is rotated forward by one tooth by the pawl 13. The conduit 44 supplying the pressure medium to the cylinder 111 (Figure 5) is thereby disconnected by the distributor valve 36 (Figure 4) from the source of pressure medium 1 or from the conduit 38 and is connected to the outer air through the recess 41 of the valve 36, while on the other hand the conduit 42, heretofore connected to the outer air, is brought into communication with the conduit 38 supplying the pressure medium, so that the latter acts upon the piston 110. Disengagement of the clutch is not possible, however, as long as the clutch members are still under load.

As soon as the throttle valve 25 has been closed in the manner described, by movement of the valve 67 into its lower position, and the clutch members 123, 124 in engagement are no longer under load, the lever 108 is rocked by the piston 110, the clutch 123, 124 is disengaged, the clutch members 125, 126 which refuse each other until synchonism is attained are brought to bear against each other and the control valve 112 is moved to the left. The passage 114 is so provided in the control valve 113 that, in the refusal position of the clutch members 125 and 126, it connects the pressure medium supply conduit 53 to the conduit 62 and compressed air is supplied to the right-hand end face of the valve 63 (Figure 3). The said valve 63 is thereby forced into its left-hand end position and the mouth of the conduit 19 is closed. This valve 63 therefore prevents the aforesaid connection of the conduit 55 with the compressed air acting behind the piston 11. On the contrary, as soon as the valve 63 has arrived in its left-hand end position, the compressed air supplied from the conduit 62 passes through the angular passage 66 to the conduit 55 and in this way forms a substitute for the compressed air previously supplied from the conduit 19. The valve 67 is therefore still held in its lower end position and the conduit 58 remains in communication with the atmosphere through the groove 71 and the orifice 73 and the throttle valve therefore remains closed.

The pressure medium supplied to the conduit 62 is now simultaneously transmitted through the conduit 120 (Figure 5) to the piston 121, which on yielding causes the brake device 122 to be operative and hence produces a retardation of the more rapidly running clutch member. Both clutch members will thereby have attained the same speed in a relatively short time. Upon the previously more rapidly running clutch member being overtaken by the previously more slowly running clutch member, the two dog clutch members 125 and 126 are brought into engagement by the pressure exerted by the piston 110 and the control valve 113 is brought into its left-hand end position. The conduit 53 is thereby closed, the conduits 62 and 120 are connected to the outer air and the brake device 122 is rendered inoperative. At the same time, the valve 63 is returned into its right-hand end position under the action of the spring 64. The conduit 55 is again connected by the passage 65 to the conduit 19 and hence to the outer air, the piston 11 having moved to its left-hand end position, the compressed air above the valve 67 escapes and the valve 67 returns again into its upper position. In this position, communication between the conduits 57 and 58 is established through the passage 69. The piston 21 is thereby again put under the action of the pressure adjusted in the chamber 91 in the above-mentioned manner by the driver. The carburettor throttle is therefore again under the optional influence of the driver.

The valve 92 shown in Figure 4 normally closes the admission of compressed air from the conduit 59 to the conduit 38 and hence to the distributor valve 36. As soon as gear-changing takes place, that is to say, as soon as there is in the conduit 55 compressed air first supplied through the control valve 76 and afterwards through the conduit 62, compressed air also acts through the conduit 56 on the valve 92 so that the latter moves into its other end position and now compressed air can also pass from the conduit 59 through the passage 95, the conduit 38 and the passages in the valve 36 to the gear-changing cylinders. The latter thus only have compressed air supplied to them when this is necessary according to the previous adjustment of the ratchet wheel 18 and hence of the distributor valve 36. As soon as gear-changing is completed, the pressure in the conduit 56 also disappears and the valve 92 moves into its upper position. In order that gear changing may be effected optionally by hand, independently of the engine speed, a valve 38b is interposed in a conduit 38a leading from the compressed air container 1 to the distributing valve casing 37. Said valve 38b is actuated by an operating pedal 38c and is adapted to allow compressed air to pass into the distributing valve casing 37 and thereby initiate the desired gear-changing operation.

By means of the handwheel 49, which if desired can be remote-controlled, the spindle 48 may be rotated in the screw-thread of the casing 3, whereby the disc 47 is moved downwardly or upwardly, so that the tension of the spring 4 is increased or diminished, whereby the predetermined engine speed at which the centrifugal governor 7 initiates an upward movement of the control valve 5, is adjusted.

Figure 6 shows diagrammatically a four speed gear with gear-changing cylinders and control means. Figure 7 shows by way of example a plan of an arrangement of the air passages for controlling the gear changing cylinders.

The gear wheel pairs 127/128, 129/130 and 131/132 are in constant mesh. The changing of the four different speeds is effected by operation of the overtaking clutches 133, 134, 135 and 136 by the levers 137 and 138. The wheel 127 is fast on the shaft 139 transmitting the driving power. The clutch 133 adapted to be coupled to the wheel 129 is slidable on one side of said shaft 139. On the other side of wheel 129 is the double-sided clutch 135/136 which is slidable on the shaft 140 and is adapted to be coupled alternately to the wheels 129 and 131. The wheel 128 is fast on shaft 141 on which the clutch 134 is slidable. Said clutch 134 is adapted to be coupled to the wheel 130. The wheel 130 is fast on shaft 142, on the other end of which the wheel 132 is likewise fast.

Gear changing depends upon the position of the various clutches. The clutches are operated by levers 137 and 138 which in their turn are dependent upon the pistons 145 and 146 movable in cylinders 143 and 144. The conduits 147, 148 open into the cylinder 143 and the conduits 149 and 150 into cylinder 144. The position of the pistons 145 and 146 and hence, through levers 137 and 138, the position of the clutches 133, 134, 135, 136 will depend upon whether the conduits are connected to the pressure medium or to the outer air. The conduits 147, 148, 149 and 150 open into the valve casing 151. 152 is the pressure medium supply conduit and 153 is an air-escape hole for connection with the outer air. At 154 is a distributing valve moved by the spindle 155 over the inlets of the conduits 147 to 150.

The spindle 155 corresponds to spindle 35 and conduit 152 to conduit 38 in Figures 1 to 4. The distributing valve 154 has through-way holes 156 to 163 and bottomed holes 164 to 171 connected by special recesses 172 to the air-escape aperture 153.

The spindle 155 moves the distributing valve 154 over the inlets of the conduits 147 to 150 (see also Figures 1 to 4). According to the various possible positions, which correspond to the speeds 1 to 4, the conduits 147 to 150 are connected some to the compressed air supply conduit 152 and some through the bottomed holes 164 to 171 and the recess 172 through the air escape hole 153 to the outer air. According to the supply of compressed air and the escape of air in the various conduits 147 to 150, the pistons 145 and 146 in the cylinders 143 and 144 will be brought to their right hand or left hand end positions, and thus, by means of the levers 137, 138 the dog clutches 133, 134, 135, 136 will be engaged or disengaged.

Figure 7 shows the exact arrangement of the air passages in the distributing valve 154. In gear-selecting, the series of holes corresponding to the various speeds and marked I to IV will be swung by the spindle 155 in the plane A, B, and thereby the conduits 147 to 150 will be connected in the correct sequence to the compressed air supply conduit or to the outer air.

*Adjustment for 1st speed*

The conduit 147 is connected to the outer air by the bottomed hole 164 and aperture 153, the conduit 148 receives compressed air through the through-way hole 156, the piston 146 moves into its left hand end position, the clutch 133 is disengaged and clutch 134 is engaged. Conduit 149 is connected to the outer air by the bottomed hole 165 and conduit 150 is connected to the compressed air supply by the through-way hole 157. The piston 146 is in its left hand end position, clutch 135 is disengaged and clutch 136 is engaged.

Power transmission is through shaft 139, wheel 127, wheel 128, clutch 134, wheel 130, shaft 142, wheel 132, wheel 131, clutch 136, shaft 140.

*Adjustment for 2nd speed*

The conduit 147 receives compressed air through the through-way hole 158; conduit 148 is connected to the outer air through bottomed hole 166. The piston 145 is in its right hand end position. The clutch 133 is engaged and clutch 134 is disengaged. Conduit 149 is connected to the outer air through the bottomed hole 167, conduit 150 receives compressed air through the through-way hole 159. The piston 146 is in its left hand end position. The clutch 135 is disengaged and clutch 136 is engaged.

Power transmission is through shaft 139, clutch 133, wheel 129, wheel 130, shaft 142, wheel 132, wheel 131, clutch 136, shaft 140.

*Adjustment for 3rd speed*

The conduit 147 is connected to the outer air through the bottomed hole 168, conduit 148 receives compressed air through the through-way hole 160. The piston 145 is in its left hand end position. The clutch 133 is disengaged and clutch 134 is engaged. The conduit 149 receives compressed air through the through-way hole 161. The conduit 150 is connected to the outer air through the bottomed hole 169. The piston 146 is in its right hand end position. The clutch 139 is engaged and clutch 136 is disengaged.

Power transmission is through shaft 139, wheel 127, wheel 128, shaft 141, clutch 134, wheel 130, wheel 129, clutch 135, shaft 140.

*Adjustment for 4th speed*

*(Shown in Figures 6 and 7)*

The conduit 147 receives compressed air through the through-way hole 162. The conduit 148 is connected to the outer air through the bottomed hole 170. The piston 145 is in its right hand end position. The clutch 133 is engaged and clutch 134 is disengaged. The conduit 149 receives compressed air through the through-way hole 163. The conduit 150 is connected to the outer air through the bottomed hole 171. The piston 146 is in its right hand end position. The clutch 135 is engaged and clutch 136 is disengaged.

Power transmission is through shaft 139, clutch 133, wheel 129, clutch 135 direct to shaft 140 without any gearing-down taking place through the wheels 128, 130, 132, 131 or one or more of them.

I claim:—

1. Change-speed mechanism for motor vehicles, comprising a change-speed gear with toothed gear wheels giving alternative ratios, pneumatically actuated gear-shifting means, valve means for controlling said gear-shifting means to bring any desired ratio into operation, manually operable means for moving said valve means to any desired operative position, and pneumatically actuated means controlled by a device responsive to engine speed for moving said valve means from a lower speed position to a higher speed position but not vice versa.

2. Change-speed mechanism as claimed in claim 1, in which the pneumatically actuated means for actuating said valve means comprise a cylinder having a piston connected with a pawl, said pawl co-operating with a ratchet-toothed member to move said valve means in one direction only.

3. Change-speed mechanism as claimed in claim 1, in which the pneumatically actuated means for actuating said valve means comprise a cylinder having a piston, said piston also constituting a valve member controlling the supply of working fluid to other parts of the mechanism.

4. Change-speed mechanism as claimed in claim 1, including a controlling valve between said valve means and a source of pneumatic power, means associated with the device responsive to engine speed for opening said controlling valve at a predetermined engine speed, and means associated with said gear shifting means for holding said valve open until a change of gear has been completed.

5. Change-speed mechanism as claimed in claim 1, including means for moving the control member for the supply of fuel to the engine, pneumatically actuated means for closing said control member, and valve means for controlling the supply of fluid pressure to said pneumatically actuated means for closing said control member, adapted to be moved by fluid pressure, the flow of fluid being controlled by engine speed.

6. Change-speed mechanism as claimed in claim 1, including a pneumatically controlled valve between said valve means and a source of pneumatic power, means associated with the device responsive to engine speed for supplying pressure fluid to open said pneumatically controlled valve at a predetermined engine speed, and a second pneumatically controlled valve through which said fluid pressure passes; and which is associated with said gear shifting means so as to be closed by the fluid pressure operating therein, said second valve comprising means whereby said operating fluid pressure is then supplied to said first pneumatically controlled valve to maintain the same open.

7. Change-speed mechanism as claimed in claim 1, including a valve mechanically controlled by said speed responsive device and a pneumatically controlled valve controlling the supply of pressure fluid to said means for moving said gear-changing valve means, said mechanically controlled valve controlling the supply of fluid pressure to said pneumatically controlled valve for controlling the latter.

8. Change-speed mechanism for motor vehicles, comprising a change-speed gear with toothed gear wheels giving alternative ratios, power actuated gear-shifting means, means for controlling the supply of working medium to said gear shifting means, means for manually actuating said controlling means so that any desired ratio may be brought into operation, and means responsive to engine speed for actuating said controlling means so that an upward gear-change is effected automatically upon a maximum engine speed being reached, said manual means alone being effective for changing to a lower ratio.

9. Change-speed mechanism as claimed in claim 8, including power-actuated means for throttling the engine fuel supply, said means co-operating with the actuating means responsive to engine speed so that throttling takes place when said actuating means has moved said means controlling the supply of working medium nearly to the end of its movement pertaining to the particular gear-changing operation being effected.

10. Change-speed mechanism for motor vehicles, comprising a change-speed gear with toothed gear wheels giving alternative ratios, pneumatically actuated gear-shifting means, distributing valve means for controlling said gear-shifting means to bring any desired ratio into operation, manually operable means for moving said distributing valve means to any desired operative position, pneumatically actuated means controlled by a device responsive to engine speed for moving said distributing valve means from a lower speed position to a higher speed position but not vice versa, a pneumatic transmission device between a manually operable member and a member for controlling the supply of fuel to the engine, and a valve in said transmission device whereby said fuel controlling member may be closed whatever the position of said manually operable member, said valve being operatively connected to said pneumatically actuated means controlled in response to engine speed so as to be operated in conjunction therewith.

11. Change-speed mechanism for motor vehicles, comprising a change-speed gear of the kind comprising alternatively engaged dog clutches having bevelled faces, pneumatically actuated gear-shifting means for engaging and disengaging said clutches to select different gear ratios, distributing valve means for controlling said gear shifting means, manually operable means for moving said distributing valve means to any desired operative position, pneumatically actuated means controlled by a device responsive to engine speed for moving said distributing valve means from a lower speed position to a higher speed position but not vice versa, a fluid-pressure-operated retarding device operatively connected to said change-speed gear and to said pneumatically actuated gear-shifting means so as to retard the more rapidly rotating clutch members during the rejecting period of the dog clutches to be engaged, a pneumatically controlled stop valve between said distributing valve means and the source of pneumatic power, means associated with the pneumatic means moving said distributing valve means for supplying pressure fluid to open said stop valve when a change of speed has been initiated by said device responsive to engine speed, and a second pneumatically controlled valve through which said pressure fluid passes and which is connected to said retarding device so as to be operated by the fluid pressure acting therein to interrupt such passage when said retarding device becomes operative, said second valve comprising means whereby the fluid pressure acting in said retarding device is then supplied to said stop valve to maintain the same open.

12. Change-speed mechanism for motor vehicles, comprising a change-speed gear with toothed gear wheels giving alternative ratios, pneumatically actuated gear-shifting means, distributing valve means for controlling said gear-shifting means to bring any desired ratio into operation, manually operable means for moving said distributing valve means to any desired operative position, pneumatically actuated means controlled by a device responsive to engine speed for moving said distributing valve means from a lower speed position to a higher speed position but not vice versa, a pneumatic transmission device between a manually operable member and a member for controlling the supply of fuel to the engine, and a pneumatically operated valve in said transmission device whereby the pressure therein may be released to effect the closing of said fuel controlling member, said valve being connected to said pneumatically actuated means controlled in response to engine speed so as to be operated by the fluid pressure acting therein and being provided with means whereby during part of its movement to its pressure-releasing position the fluid pressure acting upon it to move it to such position is admitted to said transmission device to move said fuel controlling member towards its open position.

KARL MAYBACH.